Nov. 8, 1966 D. H. YOUNG 3,283,390
MACHINE FOR MAKING BALL POINT WRITING INSTRUMENT
Original Filed Jan. 4, 1963 2 Sheets-Sheet 2

INVENTOR.
DONALD H. YOUNG
BY
Barlow & Barlow
ATTORNEYS

United States Patent Office 3,283,390
Patented Nov. 8, 1966

3,283,390
MACHINE FOR MAKING BALL POINT
WRITING INSTRUMENT
Donald H. Young, East Greenwich, R.I., assignor to A. T.
Cross Company, a corporation of Rhode Island
Original application Jan. 4, 1963, Ser. No. 249,368, now
Patent No. 3,162,941, dated Dec. 29, 1964. Divided
and this application June 16, 1964, Ser. No. 375,614
4 Claims. (Cl. 29—34)

This invention relates to a writing instrument of that type usually referred to as a ball point application of the ink to the writing surface; and this application is a division of application Serial No. 249,368, filed on January 4, 1963, now Patent No. 3,162,941, issued December 29, 1964.

Heretofore, in the formation of a writing instrument of the above type, some sort of machining operation by which a cutting action took place has been necessary in order to shape the parts as desired. Usually a tube or rod of substantial thickness has been utilized in order to provide the strength necessary, and then there has been a shaping of the parts by a cutting action to reduce some of these parts to the desired shape. When a cutting of the parts takes place, there are some chips formed of material, and in order that a proper action may take place, these chips must be removed which has resulted in additional operations which are difficult and costly.

One of the objects of this invention is to provide a ball point type of writing instrument by a method in which there will be no machining of any part of the tube in which the ball is held, thus eliminating the problems of removal of chips and the like from the operation.

Another object of this invention is to provide a ball point writing instrument from a tube which will be of a thinner stock than that usually used and the utilizing of a method of strengthening the stock by the ribbing or the like to provide strength where necessary.

Another object of the invention is the utilization of a method by which a harder or more suitable material may be employed than where machining of the stock was necessary.

Another object of this invention is to provide a machine which will perform the improved methods of procedure.

With these and other objects in view, the invention consists of certain novel features of construction as will be more fully described and particularly pointed out in the appended claims.

In the accompanying drawings:

FIG. 1 is a sectional view of a fragmental part of the machine which is utilized for the formation of the writing instrument here referred to;

Figure 1:
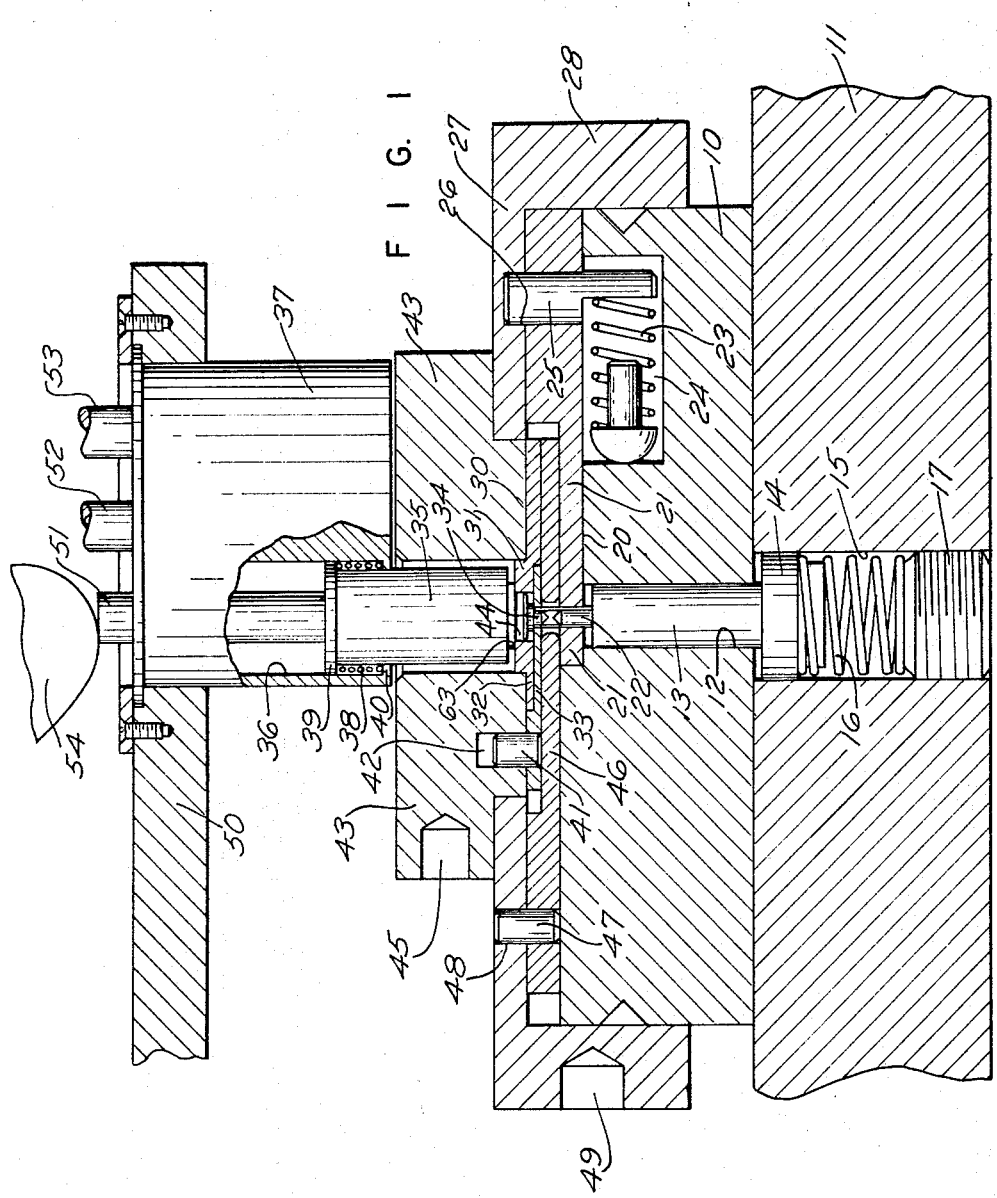

In proceeding with this invention, I utilize a tube having a thin wall thickness, the tube having an internal diameter of substantially the size of the ball which is to be retained and which may be any suitable size depending on the width of written line desired, and I indent this tube intermediate its ends so as to provide ribs, the upper ends of which provide abutments and a seat for the ball, the ball being seated by driving the ball, which is harder than the stock of the tube, into these abutments so that it forms a seat therein by the formation of several slight concavities on an arc of the sphere the size of the ball, and then I bend in the edge of the tube over the ball by pressure so as to hold the ball captive on this seat. Both the tube and ball and the necessary tools are held concentric to each other by mechanical means during this operation. The usual rolling of the inturned end to loosen the ball somewhat in its cup is performed, if necessary.

With reference to the drawings, the apparatus which I utilize for this purpose consists of a base 10 which rests upon a block 11. This base 10 has in it a bore 12 receiving a plunger 13 which has an enlarged head 14 guided in the bore 15 of the block 11 and forced upwardly by spring 16 abutting the end of this head 14 and adjustable as to pressure by means of the threaded plug 17 in the block 11. The base 10 has three equally spaced slots 20 therein in which the clutch jaws 21 are reciprocally mounted, which move toward and from the pin 22 carried by the plunger 13. These clutch jaws are forced outwardly by a spring 23 located in recess 24 in the base 10 and acting upon pin 25 carried by each of the clutch jaws and operable in a cam slot 26 in plate 27 so that, as the flange 28 is rotated on the base 10, these clutch jaws will be moved inwardly until they engage and hold a tube centered on the pin 22.

A plate 30 has a raised portion 31 at its center and is provided with three equally distant radial slots 32 in which clutch jaws 33 are slidable so as to move these jaws radially inwardly toward and from the pin 34 carried by a second plunger 35 carried in the bore 36 of a turret 37. A spring 38 acting between shoulder 39 and shoulder 40 of the turrent serves to raise the plunger from the position shown in FIG. 1. A pin 41 is mounted in each of these clutch jaws 33 and operates in a cam slot 42 in the cylinder 43 which may be rotated to move the upper clutch jaws 33 to and from gripping position with the tube centered by the pin 34. A handle may be inserted in the recess 45 to rotate thisc cylinder.

Indenting tools 46 which in this case are illustrated as six in number are radially slidably mounted between the plate 30 or jaws 33 of the upper clutch and the top of the base or jaws 21 of the lower clutch and are movable radially toward and from the axial center of the work when supported on pins 22 and 34. These working tools are each provided with a pin 47 which engages a cam slot 48 in the plate 27 so that when this plate is rotated similarly by some handle inserted into a slot 49, the plate will be turned to force the tools 46 inwardly so as to indent and rib the tube. The cam slots 26 and 48 are so arranged that the clutch jaws move in and grip the work piece prior to the indenting tools 46 operating on the work piece.

The turret 37 is mounted in a suitable support 50 and carries three plungers, plunger 35 having stem 51, another plunger having stem 52 and an additional plunger having stem 53. Any suitable means can be utilized for forcing the selected plunger downwardly such as a cam 54, and each plunger as it is moved beneath this cam in registry with the work held on pin 22 may be successively moved downwardly as the steps in the operation progress. Each tool is kept in exact registry with the work by means of shoulder 44 held in position by an opening in fixed stop plate 30.

Figure 2:
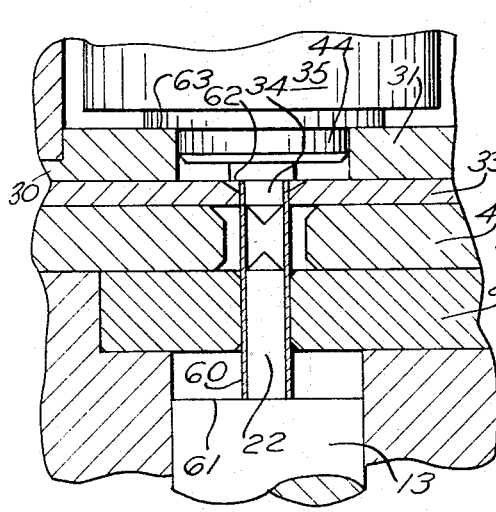
FIG. 2 is a fragmental sectional view illustrating the operating parts and a tube in position therein.

As shown in FIG. 2, the pin 22 of plunger 13 has received thereon a tubular piece of work 60 which engages the shoulder 61 of this plunger 13. The next step in the operation is that the plunger 35 descends so that its pin 34 will enter the upper end of the tube 60, and this pin has a shoulder 62 which engages the upper end of the tubular work 60. This plunger also has a shoulder 63 to engage the raised portion 31 on a plate 30 so as to limit its downward movement. Thus when the plunger 35 descends and forces the work downwardly, the shoulder 63 serves as a means for locating the upper edge of the tube in the exact desired location in the machine. As this plunger 35 descends and forces the tube downwardly to locate the upper end of the tube, plunger 13 also moves downwardly against the action of spring 16 through the thrust of the work, thus providing for any irregularities in the length of the work.

After the tube is located as above mentioned, the jaws 33 of the upper clutch are caused to move inwardly by rotation of the cylinder 43 so as to grip the upper end of the tube. With the tube so positioned, then the plate 27 is rotated so as to first cause the jaws of the lower clutch 21 to move inwardly and engage the tube as shown in FIG. 2 at which point the tools 46 do not engage the tube. However, upon further rotation of the plate 27, then the tools 46 move inwardly to engage the tube and force it inwardly about the bevelled ends 64 and 65 of the locating pins (see FIG. 3). These tools 46 are such as to provide internally extending ribs 66 (see FIG. 7) extending inwardly and leaving rib 67 in between the ribs 66 or in other words providing a uniformly curved undulating pattern of stock such as shown in section in FIG. 7. The ends of the pins 64 and 65 are about 45° to the vertical and provide abutments 73 at their upper ends leaving a cup 70 at the outer end for the reception of a ball 71.

Figure 3:
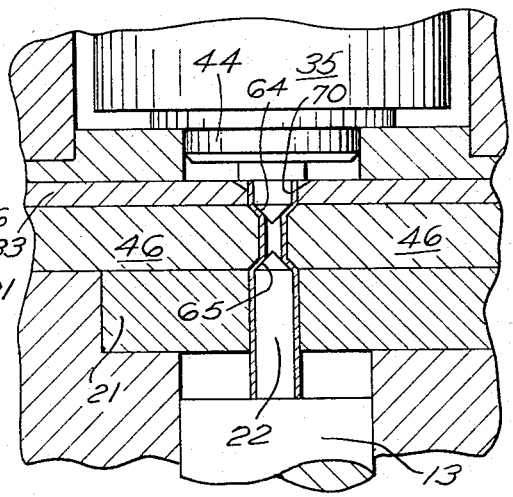
FIG. 3 is a view similar to FIG. 2 showing the parts of FIG. 2 in a different position and the tube partially formed.
Figure 4:
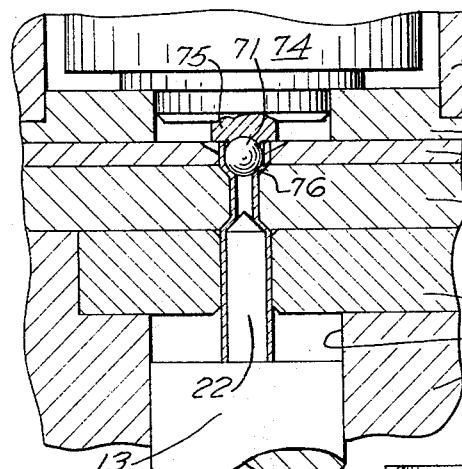
FIG. 4 is a sectional view showing some of the parts of FIG. 2 but with the ball in place and a different plunger engaging the work as a further step in the operation.
Figures 6, 7, 8:
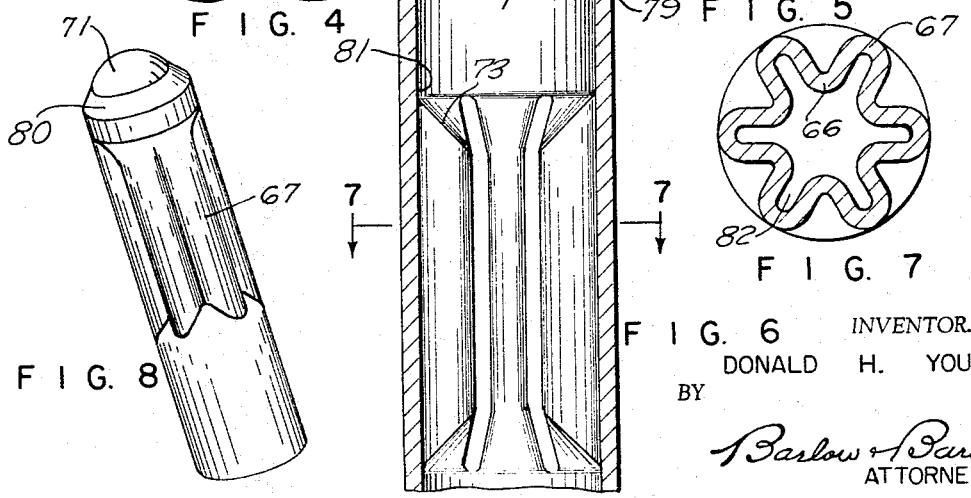
FIG. 6 is a sectional view on a greatly enlarged scale of the tube in the condition in which the tube has been formed after the operation of FIG. 3.
FIG. 7 is a section on line 7—7 of FIG. 6.
FIG. 8 is a perspective view of the completed ball pen point.

After these tools have performed their indenting operation as shown in FIG. 3 and illustrated on a larger scale in FIG. 6, the plunger 35 and its pin 34 are withdrawn from the work and a ball 71 is dropped into position in the cup 70 of the tube and will rest against the abutment such as 73 in the tube. The forming tools 46 and clutches 21, 32 are still in position, not having been withdrawn from the position shown in FIG. 3. At this point the third plunger 74 having an engaging hammer 75 is brought downwardly onto the ball as shown in FIG. 4 so as to drive the ball into the abutments 73 and forming a concave seat 76 in the abutments 73 in each of their six locations. This plunger 74 is then withdrawn from engaging with the work, and at the same time the clutch jaws 33 are withdrawn from engagement with the work.

Figure 5:
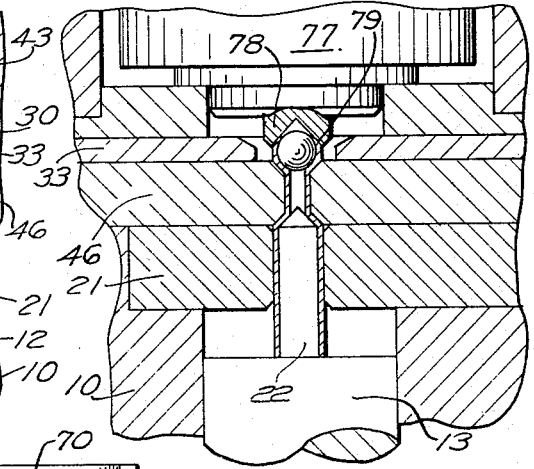
FIG. 5 is a view similar to FIG. 2 but showing a still different plunger engaging the work and showing the ball seated and confined as a further step in the operation.

The turret is then rotated to bring the next or fourth plunger 77 into registry with the work as shown in FIG. 5 which then descends. This plunger 77 has a bending tool 78 at its end which will engage the edge 79 of the tube and bend it inwardly over the ball at a location such that the edge will be just a little higher than the center of the ball so as to hold the ball captive in the cup 70, and at the same time sufficient pressure will be exerted on this tube so as to bevel its edge 80 by pressure thinning the tube down to reduce the thickness of the tube so as to provide the bevelled edge 80. If necessary, further thinning of the bevelled edge 80 may be accomplished by rotation of forming tool 78 while still engaged. This is the finishing operation of this machine, and the ball now held captive in the tube will be removed from the machine after which there may be a further spinning operation with tools engaging the bevelled edge 80 so as to adjust the ball tightness within its cup 70 where it is held captive. This adjustment of the ball tightness is such that the ball will then rotate in the cup and cause a delivery of ink to be had on the paper.

By reason of the 45° abutment 73, a ball which is inserted in the cup and engaging the seat will not contact the junction 81 of the bevelled surface and the side of the tube, thus leaving a continuous ring or gallery at all times to which ink may be fed through the channels 82 (see FIG. 7) between the ribs 66. Thus the ball is continuously supplied with ink held in the tube and fed to the tube through channels 82 and gallery at 81.

By proceeding as above, no cutting, grinding or other machinery operation are necessary as all shaping is done by bending of the stock while substantially retaining the wall thickness or thinning the stock by pressure or spinning. No stock is removed and thus removing shavings or the like is unnecessary. By this method a more suitable stock may also be employed.

I claim:
1. In a mechanism for forming a ball point writing instrument, an axially movable positioning plunger having a pin to enter the bore of tubular work and a shoulder to engage its end, a spring urging said plunger axially in one direction, a second plunger positionable to move along the axis of the first plunger and having a pin to enter the bore of tubular work at its other end and a shoulder to engage said other end to locate the same, means to axially move the second plunger to move the first plunger against the action of said spring and by said shoulder of the second plunger axially locate the work, two sets of spaced clutch jaws movable radially of the axis of said plungers to engage the work tube at the area of said pins, a plurality of forming tools movable radially inwardly between said sets of clutch jaws to force the work inwardly and provide axially extending ribs on the work and to provide support for further operations.

2. In a mechanism as in claim 1 wherein said second plunger is in a turret and said turret carries a third plunger to drive a ball against the ends of the work ribs to provide a ball seat.

3. In a mechanism as in claim 1 wherein said second plunger is in a turret and said turret carries a third plunger to drive a ball against the ends of the work ribs to provide a ball seat and a fourth plunger to bend inwardly the end of the tube over the ball.

4. In a mechanism as in claim 1 wherein said second plunger is in a turret and said turret carries a third plunger to drive a ball against the ends of the work ribs to provide a ball seat and a fourth plunger to bend inwardly the end of the tube over the ball and exert sufficient pressure to thin the edge of the tube, the fourth plunger to be either selectively rotatable or not rotatable depending on materials used requiring the need for additional thinning of the edge of the tube.

No references cited.

RICHARD H. EANES, Jr., *Primary Examiner.*